United States Patent
Johri (10) Patent No.: US 11,063,931 B2
(45) Date of Patent: Jul. 13, 2021

(54) NON-PERSISTED PROOFS

(71) Applicant: Rajul Johri, West Jordan, UT (US)

(72) Inventor: Rajul Johri, West Jordan, UT (US)

(73) Assignee: Rajul Johri, West Jordan, UT (US)

( * ) Notice: Subject to any disclaimer, the term of this patent is extended or adjusted under 35 U.S.C. 154(b) by 182 days.

(21) Appl. No.: 16/392,519

(22) Filed: Apr. 23, 2019

(65) Prior Publication Data

US 2019/0253406 A1 Aug. 15, 2019

Related U.S. Application Data

(63) Continuation of application No. 15/188,986, filed on Jun. 22, 2016, now Pat. No. 10,333,923.

(51) Int. Cl.
| | |
|---|---|
| *G06F 21/00* | (2013.01) |
| *H04L 29/06* | (2006.01) |
| *G06Q 50/26* | (2012.01) |
| *G06Q 20/40* | (2012.01) |
| *G06F 21/36* | (2013.01) |
| *H04W 12/06* | (2021.01) |
| *H04W 4/80* | (2018.01) |
| *G06Q 20/34* | (2012.01) |
| *G06Q 20/32* | (2012.01) |
| *G06Q 20/20* | (2012.01) |
| *G06F 3/041* | (2006.01) |
| *G06Q 30/02* | (2012.01) |

(52) U.S. Cl.
CPC ............ *H04L 63/083* (2013.01); *G06F 3/041* (2013.01); *G06F 21/36* (2013.01); *G06Q 20/204* (2013.01); *G06Q 20/206* (2013.01); *G06Q 20/325* (2013.01); *G06Q 20/3278* (2013.01); *G06Q 20/352* (2013.01); *G06Q 20/40* (2013.01); *G06Q 20/401* (2013.01); *G06Q 20/4014* (2013.01); *G06Q 30/0238* (2013.01); *G06Q 50/265* (2013.01); *H04L 63/0861* (2013.01); *H04W 4/80* (2018.02); *H04W 12/06* (2013.01); *G06Q 2220/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0325721 | A1* | 12/2010 | Bandyopadhyay | ... G06F 21/316 726/19 |
| 2015/0256898 | A1* | 9/2015 | Morton | ................ H04L 9/0841 380/210 |
| 2017/0161490 | A1* | 6/2017 | Fedor | ..................... G06F 21/31 |

* cited by examiner

*Primary Examiner* — Alexander Lagor (57) ABSTRACT

The traditional authentication mechanism of using a public username and a constant secret password needs to be improved upon.
A framework and a method is described which allows for much more secure authentication compared to the traditional username/password method. The method is useful for first party authentication as well as non-repudiation of digital information. The non-repudiation is achieved as a by-product of high entropy of the authentication method.
The method relies on generation of high entropy tokens (called flakes) as a by-product of authentication. Since these tokens do not exist before being created, and their creation relies on user input, they are non-persisted proofs of user presence.

1 Claim, 8 Drawing Sheets

Flake generation

Fig. 1    Traditional authentication

Fig. 2   Newauth authentication - username

Fig. 3  Newauth authentication - username

Fig. 4  Newauth authentication - flake

Input – Self

Output -1 - Failure

Output -2 Success

Fig. 5 Newauth interactions - flake

Fig. 6   Flake generation

Fig. 7 Flake

1

Hash
Flake graphed radially
Create time

2

Fig. 8 Flake generation – General method

NON-PERSISTED PROOFS

BRIEF DESCRIPTION

The traditional username and password based authentication method has been challenged and successfully broken into, on countless occasions. We hear about hacks on information systems practically every day. These compromises inflict huge costs on organizations and people who are the victims of these hacks.

The traditional authentication method relies on the secret password being and remaining secret. Also, since the password, when entered conveys no guarantee as to whether it was indeed entered by the owner, a lot of effort is needed to keep it secret. The assumption is that if the password remains a secret, then only the owner will be able to provide it. It can be seen that all known breaches prove this assumption to be wrong and dangerous. Since another user was able to get hold of the owner's password, then it was no longer a secret. Moreover, when, the password is entered into the system, the system does not have a way to guarantee that it is indeed the owner who is entering the password.

These vulnerabilities are shared by the asymmetric cryptography methods (digital certificates etc) as well. Currently, digital certificates are used as a means to facilitate non-repudiation of digital information. Only the owner of the private key is supposed to be able to sign the information, which is verified by their public key. Since the private key used in these methods is static, the non-repudiation afforded by it is limited also. It is possible for the private key to be stolen and thus, someone else can create the information which is supposed to be coming from the owner of the private key. We notice here also, that a lot of effort is needed to keep the private key secret, for the non-repudiation guarantee to have any worth.

The vulnerabilities described above essentially emanate from the fact that the proof of knowledge (or possession in case of private keys) already exists. In password based authentication, the proof exists in the system's database and perhaps additionally in some notebook the user keeps their secrets in. In PKI, the private key is a file which stays on the user's device.

We describe here a framework which is more secure than traditional methods and also capable of guaranteeing that it is indeed the owner of the account who is entering the proof. We establish the security of the framework by comparing its entropy with the entropy of traditional password system. We refer to the non-repudiation guarantee as, "proof of user presence".

In order to achieve the requisite entropy, the authentication method needs to possess a feature called "variance of the proof of knowledge". This feature allows us to essentially change the proof/password every time the user accesses the system. This resultant high entropy allows us to establish user presence. The idea is that, since the proof/password is not static, it can not just be replayed by a machine or another bad actor. It requires a human to generate the proof, and we authenticate the human involved. It is evident that in order for a proof to be a guarantee of user presence, it needs to be non-persisted (it should not exist anywhere). The non-persistent nature of the proof adds to the entropy of the authentication method and the entropy makes it eligible to be a proof of user presence.

We also note that a round about way to achieve variance of proof of knowledge exists in current systems which employ multi-factor authentication (or 2 factor authentication, 2FA). In those systems, other than the static password, the host system also generates a dynamic key which the user is supposed to enter along with the password. The problem with these systems is the communication of the dynamic key to the user. In current systems, this dynamic key is conveyed to the user through a different communication medium (email, SMS etc). We contend that this approach, although more secure, is less user friendly. The user needs to carry their phone or need to check a different email system in order to get the dynamic key. Current invention's way to achieve "Variance of proof of knowledge" feature allows it to achieve the same functionality as 2 FA without requiring the user to consult another device. Moreover, it's approach also has the benefit of making the authentication more or less difficult based on transaction risk. That feature is not available in current 2FA based systems.

BACKGROUND AND FIELD OF INVENTION

The present invention relates to creating an alternate authentication mechanism for digital transactions. The core of the invention revolves around creating a high entropy password. This password keeps changing from one attempt to another. Since the high entropy involved ensures the uniqueness of the password, the password also works as a userID. The invention seeks to create a framework which allows for highly secure transactions and guarantees non-repudiation of transaction sequence.

The current invention builds on the features described in the predecessor application. We continue to refer this invention with the predecessor's name, Newauth.

Security of a text password based system is measured by the entropy of the system. It is represented as $$E = \log_2(C^L)$$

Where 'C' is the size of the character set and L is the length of the password. Most advanced password based systems expect users to include special characters, numbers, lower and upper case letters in their password. That restriction increases the 'C' in the above formula. These systems also enforce a minimum length of the password, thus increasing the value of 'L'. The Entropy is highly sensitive to the length of the password. As an example A 10-character, upper/lower-case password has 57.004 bits of entropy.

An 8-character, full ASCII character-set password has 52.559 bits of entropy.

Here is an interpretation of entropy (source: http://rumkin.com/tools/password/passchk.php)

<28 bits=Very Weak; might keep out family members 28-35 bits=Weak; should keep out most people, often good for desktop login passwords 36-59 bits=Reasonable; fairly secure passwords for network and company passwords 60-127 bits=Strong; can be good for guarding financial information 128+bits=Very Strong; often overkill Here is another interpretation of the entropy of text based passwords.

(source: https://www.reddit.com/r/dataisbeautiful/comments/3221bk/time_required_to_bruteforce_crack_a_password)

According to this source, a 68 entropy password will take 94 years to crack assuming a computer tries 1 billion attempts per second. The same password can be cracked in 9 years with a computer that tries 100 billion attempts per second. Likewise, at an entropy of 90, these same computers will take 39 billion years and 392 million years respectively.

The notion of a password is quite different in the current invention. Even then, we could model the entropy of the password in the current invention. Since there is no single password, we need to incorporate the fact of variance in the entropy calculation. In the predecessor invention, the user clicks on points on a set of images. We could think of the set of all points in one image as the character set. The image could be large or small. The number of points on a 3000× 2000 pixel images will be 6 million. Similarly, the number of points on a 400×600 pixel image will be 240,000. We also need to keep in mind that a user can not realistically select one pixel on an image. Instead of individual pixels, we think of an image as composed of segments. As a conservative estimate, we can assign 100×100 segments to an image, which results in the character set of 10,000. In the predecessor application, we established that the system is designed to increase or decrease the size of image set presented to the user depending upon the risk of the transaction. For estimation purposes, we can consider a set or 3 and 4 images. In practice this size could be lower or higher, which will result in lower or higher entropy compared to present estimates. The image set is randomly selected from a larger set which is familiar to the user. We will assume the larger set of 16 images. The entropy of this setup can be represented as $$E=\log_2(C^L * n!/(n-L)!)$$

The first term, $C^L$ is familiar from the earlier text based password's entropy formula. The second term is the permutations of sample size L drawn from n objects (L images out of n total images).

Using
 C=10000 [size of the character-set]
 L=3 [number of images presented to the user]
 n=16 [total number of images setup for the user]
We get a value of 51.57 for the entropy
For L=4, we get an entropy value of 68.56.

Notice that the entropy value for size 3 set is equivalent to an 8 character password using full ASCII character-set. Also notice the jump in entropy for an image set of size 4. The entropy jumps to 68.56. This is more than the entropy of a 10 character password using full ASCII character-set, which, in terms of time should take a computer trying 100 billion attempts a second, more than 9 years to crack.

We can see that with this setup, the invention achieves fairly sizable entropy measures. It is our contention that this base setup is more user friendly than the text based passwords of equivalent entropy. Essentially, we argue that it is easier for a user to click on 3 or 4 images rather than remember and type 8 or 10 character passwords containing numbers, lower-case, upper-case letters and special characters.

Enhanced Entropy and Flakes

The base case described above, can be improved further by introducing another feature. In traditional username/password based system, the username is usually a publicly known value. That username signifies an address of some type. An email address, phone number, account number, user id and so on. The entropy of the traditional system can be doubled, by making the username also a secret. But, that would create usability issues. If this approach is adopted for a traditional authentication system, this would imply two secret text values, and it may be too confusing for the user and they may mix up username and passwords. Additionally, most systems use the username as the token for others to interact with the user. A common example is email. If username (email address) is made secret in an email system, it will become impossible to send message to the user. The email system needs to know the username (email address) for routing the message to the correct user.

The present invention does not have a text based password, so, it is possible to increase the entropy of the system by making the username secret. This design choice does not present any usability issues, since we do not ask the user to remember two text values.

With this enhancement, we can modify the entropy formula as $$E=\log_2(T^u * C^L * n!/(n-L)!)$$

The second term, $C^L$ and the third term, $n!/(n-L)!$ are familiar from the earlier formulas. The first term $T^u$ is the enhancement to the entropy. Here, T, is the size of text alphabet set and u, is the minimum length of the secret username. Notice that C and T are two different character sets. T is the text based character set used for constructing username. C is the image based character set to select image segments.

Using
 C=10000 [size of the character-set]
 L=3 [number of images presented to the user]
 n=16 [total number of images setup for the user]
 T=94 [full ASCII character set]
 u=6 [minimum length of the username]
We get a value of 90.90 for the entropy. For L=4, we get an entropy value of 107.89. These entropy values (90.9 and 107.9) are analogous to text based passwords of size 14 and 16 respectively. We can see that this method of entropy enhancement works very well, without introducing usability issues. By making the username secret, we are able to generate much higher entropy using the same size of image set.

That leaves the addressing issue remaining. If the username is secret, then how can one user on the network address another user?

Volatile Identity or Flakes

Figure 6:
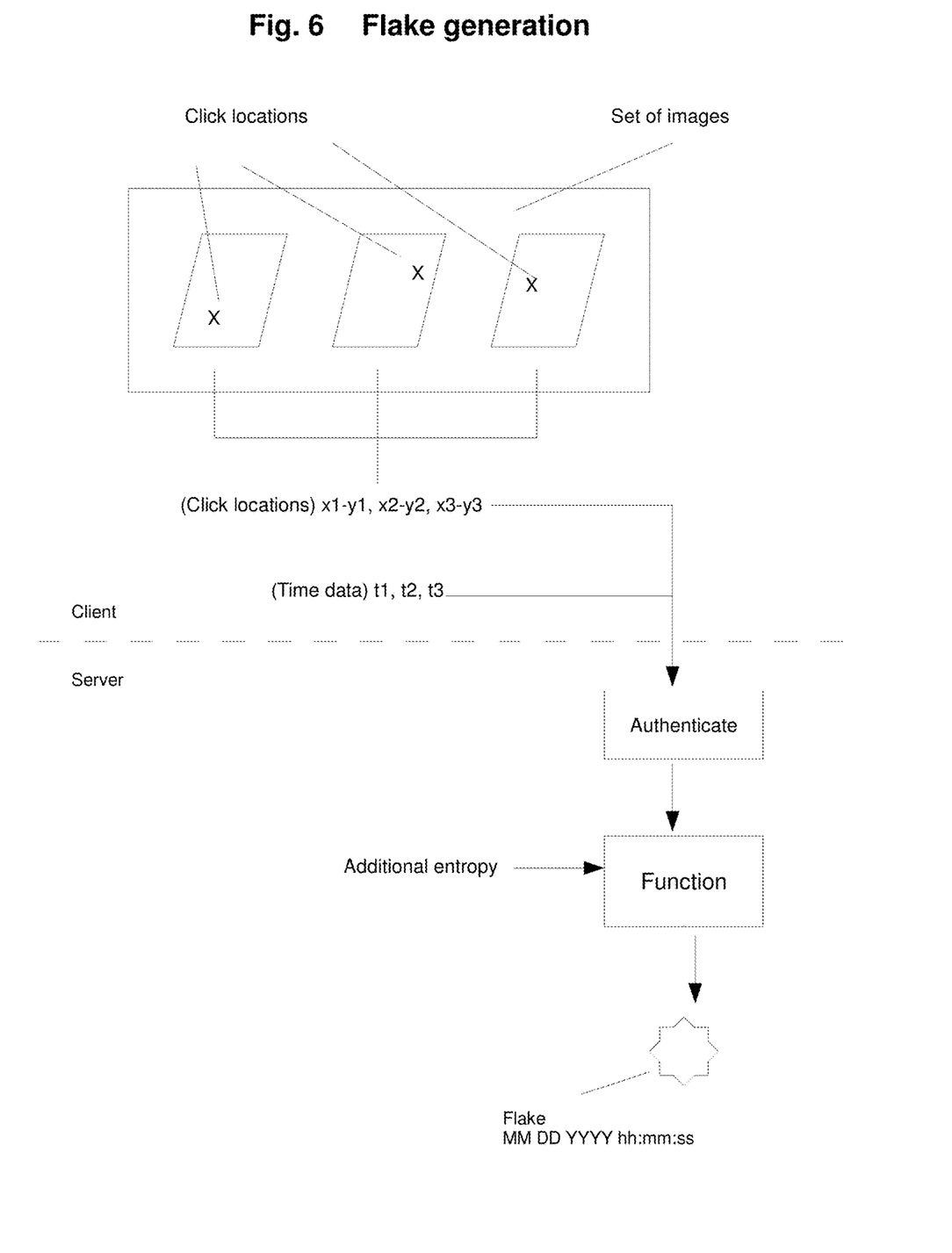
Figure 7:
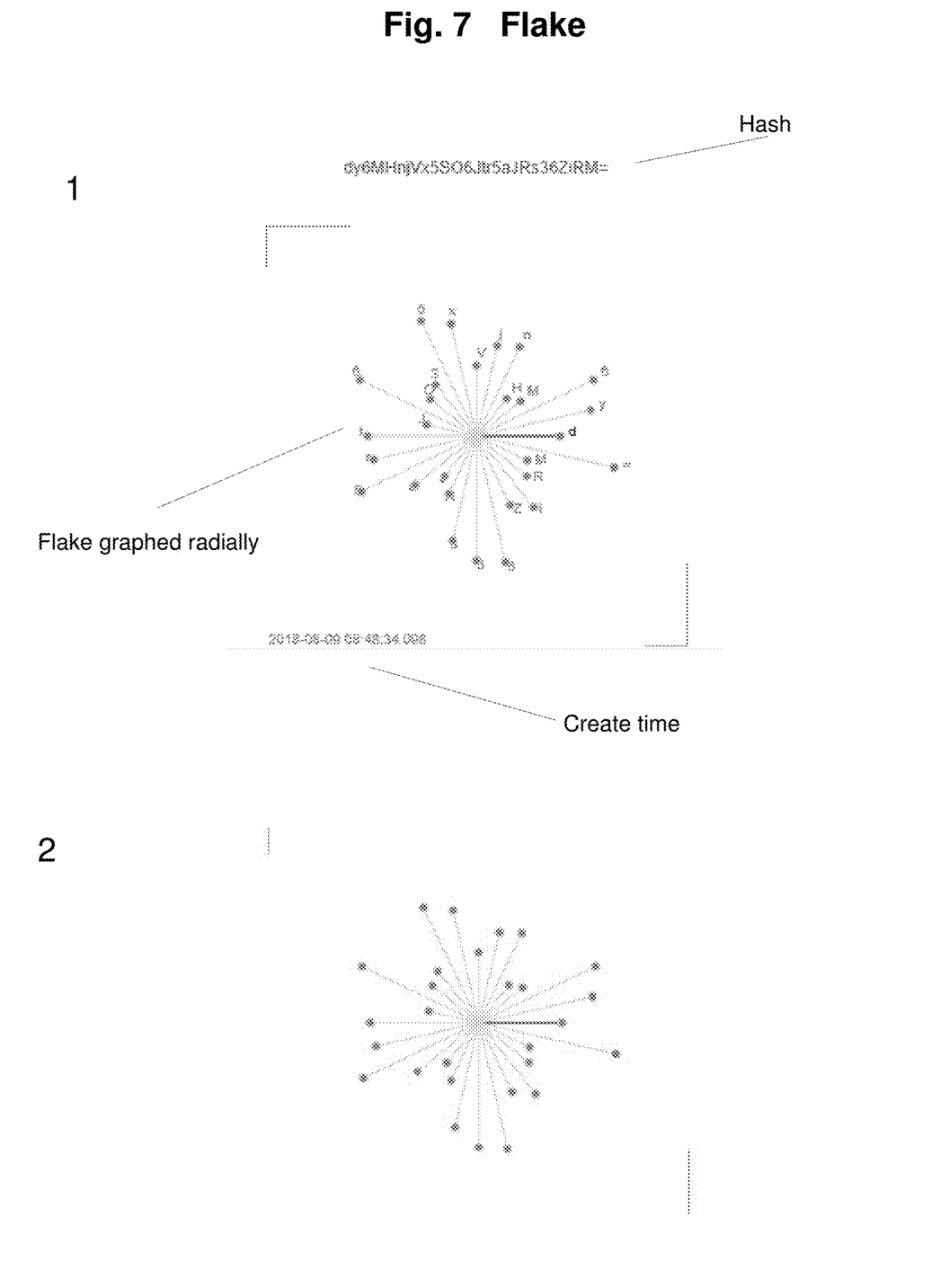
Figure 8:
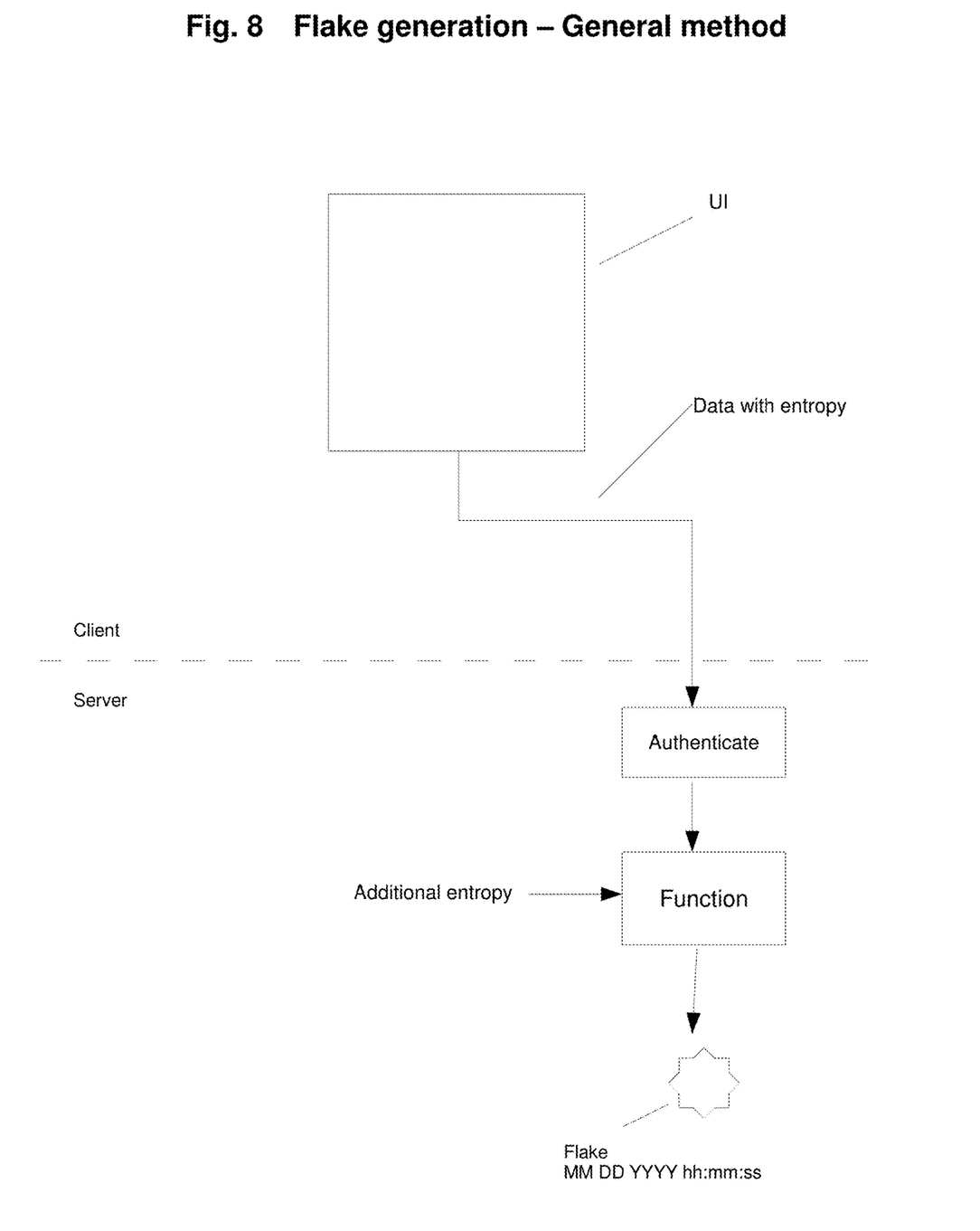

The issue of user addressing is solved differently in the current invention. The system does not use the secret username to address the user. Upon every successful authentication, the system assigns a temporary alphanumeric token called "flake" to the user. The flake is generated by the data generated by user's clicks on the images during authentication (FIG. 6). The system hashes the click information (co-ordinates, time taken to click etc) with a random salt and the time stamp to create the flake. A flake uniquely identifies a user in the system at a given time. All interactions (messages, financial transactions, goods exchanges) within the network happen between pairs or groups of flakes. In the current invention, the interactions are originated by flakes and consumed/completed/authorized by flakes.

Here are the features of the data that is used to generate the flake. We will assume that the flake is generated under the following conditions.

The user authenticated with a set of 3 images.
 The user selected segments 12, 14 and 8 on the three images
 The images were 1000 to 2000 pixel wide and 700 to 900 pixel high.
 The user took 1354, 2176 and 1678 milliseconds to click on each image.
 Clicked co-ordinates (x-y) on the images were
  657-435 [x1-y1]
  439-543 [x2-y2]
  213-300 [x3-y3]

The flake is a hash of some function of all the numbers above (except for the segment ids). Segment Ids could be ignored because they do not add to the entropy. Co-ordinates are enough for that purpose. The time taken for first click is discarded in this example. The first time value could also be included in flake generation. Here are the input numbers based on above data (considering only times after the first click)

657-435-439-543-213-300-2176-1678

One example function is concatenation. There could be other functions also like multiplication, power functions etc. Those could also be used to generate the new number. The output created by concatenating all the numbers is 6574354395432133002176 1678

This number is hashed with a random salt. We could use a random word or current timestamp for the purposes of salt. We take "redwood" as the salt value in this example. In base64, SHA 256 hash of "6574354395432133002176 1678redwood" is N43iglFqKKt8ZqQsh6Pq/mdMcMpNiyL04bEJEPfP/Tg=

It may not be necessary to append the salt to this number. A large number like that has enough entropy to guarantee uniqueness. The hash value generated is a volatile identity which can be used as the proof of presence of the user. This hash is also called "flake". This can be used both, as a username and a password of the user. It is a volatile identity represented by a token.

It is also possible to use a portion of this token as the user ID and use either the remaining portion or the whole as the password. For example, in the previous example, we could use first few characters as the user name and the rest as the password for this user.

If we chose to use first 10 characters as the username, we will have

Username: N43iglFqKK
Password: t8ZqQsh6Pq/mdMcMpNiyL04bEJEPfP/Tg=

Notice that the same user will have a different username and password after next authentication. In this usage mode, Newauth need not return the full flake to the client machine. It could only return the username part. This usage of flake is intended to facilitate inter-operability of Newauth with traditional password based systems. A user could create a setup where their legacy system is linked to Newauth in a way that their user name and/or password are automatically changed once they create a new flake. This makes their legacy systems much more secure and allows them seamless access to those systems from within Newauth.

The flake is different from other one time tokens which are generated by most server applications today. Other tokens do not have guarantee of user presence, because the information used to generate those tokens has no user input. It can also not be argued that other tokens generated by other server application after user authentication are guarantees of user presence. We have already discussed the limitations related to passwords while considering them as guarantee of user presence. A password exists a priori. A flake does not. Flake is generated based on the information created by the user and since it is generated after user authentication, it is a proof of user presence.

Moreover, since the flake has the create time attached to it, the flake allows for use-cases where a time based action is required. Flake can be used in place of a username because its unique value can uniquely identify a user. After generating the flake, the user can pass this flake to another system, which can treat this flake as a proof that the system is interacting with the intended user. The other system will generally query the Newauth system (the system which was used to generate the flake) to confirm the existence of the flake. It is also possible to digitally sign the flake, along with create time and any other user information as appropriate, using asynchronous cryptography, where the receiver of the "signed" flake need not call Newauth to verify the authenticity of the flake. If the receiver system is able to verify the signature based on Newauth's public key, that can be used by the system to proceed with the flake's usage.

We need to compare this with the current model of asymmetric cryptography which is also used to provide non-repudiation guarantee. In the prevalent model, the user needs to keep their private key securely with herself. The user uses that key to sign any information she needs to share with a third party. This imposes a burden on the private key owner to keep the private key secret. This problem arises because the private key exists before it is used. Flake, in the current invention does not have this limitation. A flake does not exist before the user uses it. This relieves the user from the burden of safeguarding any information. It also offers a far better non-repudiation guarantee to the third party than the prevalent model because the third party does not need to fear that the message could instead be coming from a malicious user.

Because of the high entropy implicit within the flake generation, a flake is a guarantee of user presence, like no static password can ever be. Because of the high entropy, it is impossible for even the same user to generate the same flake at two different occasions even if the set of images presented to the user is identical on both occasions. In order for the user to generate the same flake twice, the following will need to happen 1. User receives the exact same set (in same order) of images to click on.
2. User clicks on the exact same points (down to a pixel) like she did in the previous attempt.
3. The user takes exactly the same amount of time to click on the images as the previous attempt (down to a millisecond).

The three conditions are ordered in the increasing order of randomness. Point 1 is possible. Point 2 is very difficult to achieve. Point 3 is humanly impossible to achieve. The combination of all three events is not expected happen in two different transaction.

It is impossible to steal a flake and thereby authorize a transaction on behalf of another user, because flake does not exist anywhere to steal from. It is created by the user at the time of authentication and even the same user can not generate the same flake twice, as described earlier.

Moreover, since the time stamp of a generated flake is known with precision, it is possible to implement use-cases which are not imaginable by passwords or other static means of authentication (including finger prints, iris scans and such) alone. It is possible to ensure that the user authorizes a transaction based on some arbitrary time constraint. For example, we can say that a certain transaction could only be authorized by a specific user's flake generated after a period of time. This is useful in situations where some information is time sensitive and should only be available to a user after a certain time. Examples of such pieces of information are wills, auction bids, examination questions etc. With flakes, it is possible to create such information and distribute it with a time constraint that the participants can see that information only after a specified time. With today's technologies, the only way to do this is to involve a third party and trust that the third party will honor the time constraint.

Another example with wider applicability is payments. It is possible to attach a condition to the sale in the system that they can be paid for only with a flake generated after the bill is created. This solves the prevalent problem of credit card fraud. Credit card fraud is possible because networks authorize a transaction based on information (credit card number, CVV, expiration date etc) which exists before the transaction happens. A flake, on the other hand does not exist until it is created by the only user who could create it. The condition of a flake generated after the sale is just an example. If this is seen as user unfriendly, a more suitable time condition can be implemented. Say, a flake generated within the last 24 hours of the sale, as an example.

The main point to note here is that in the new system, instead of a static password, finger print, iris scan, single use token, we rely on a dynamic "proof of presence" represented by a flake and since it is dynamic, we are able to impose time based conditions on it. This feature does not make sense in a static password regime. The static password regime can not even guarantee that the static password was entered by the actual owner.

DESCRIPTION OF THE PREFERRED EMBODIMENT

Figure 1:
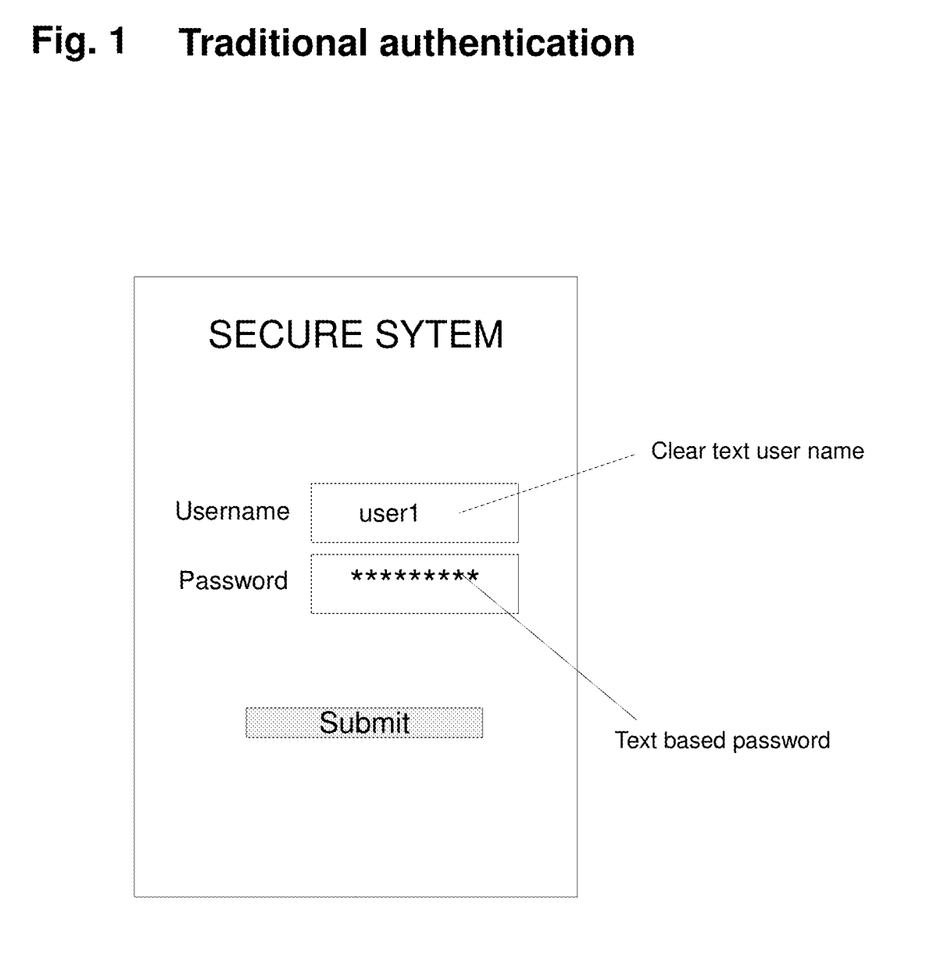
FIG. 1 Displays features of traditional password based authentication. The traditional system uses a clear text user name and a secret text based password.
Figure 2:
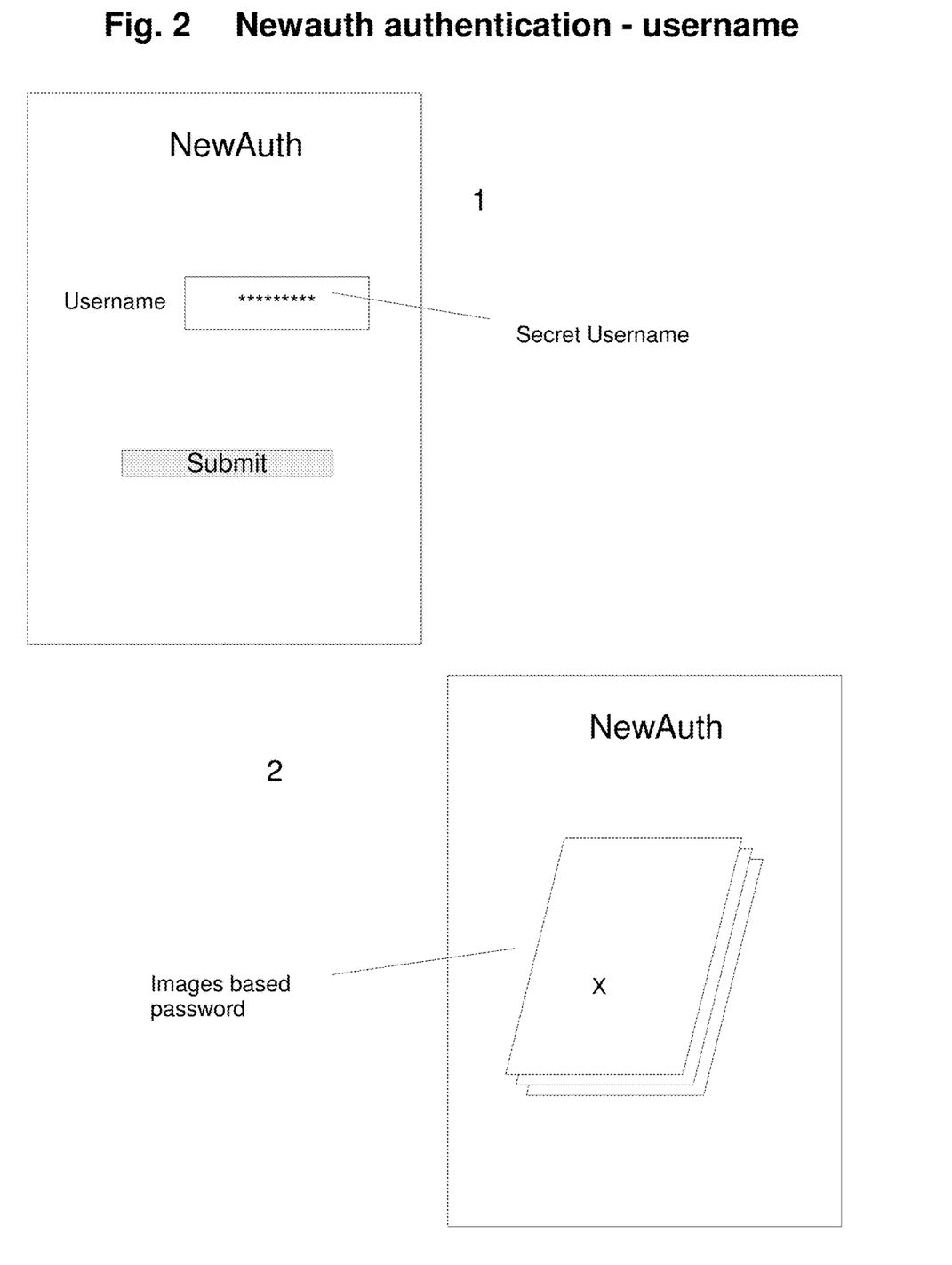
FIG. 2 Displays one input mode of the preferred embodiment of the invention. Here, the user enters a secret username (1) and is presented with a set of images (2).
Figure 3:
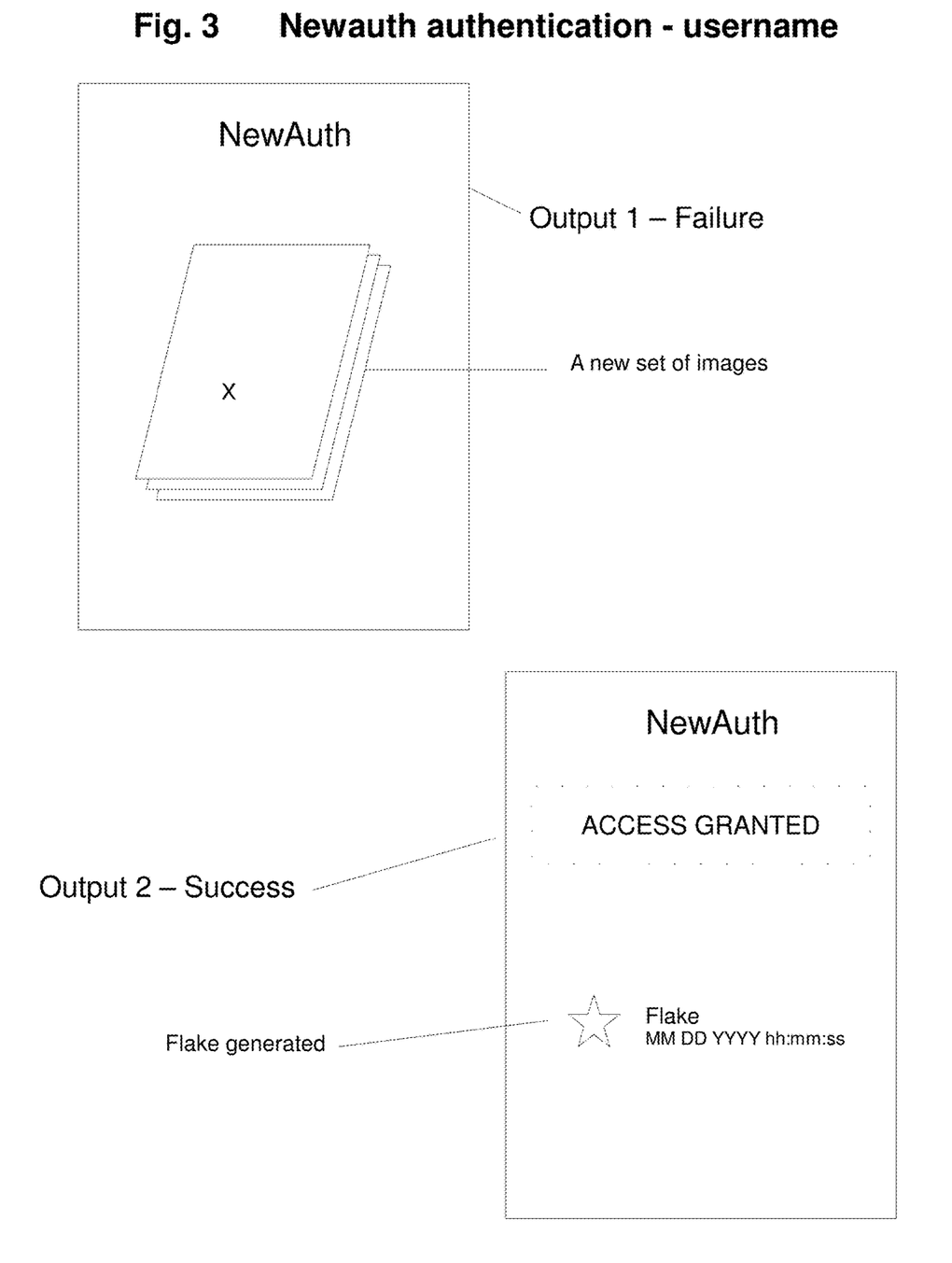
FIG. 3 This figure displays the output resulting after the user clicks on images in FIG. 2 (2).
Figure 4:
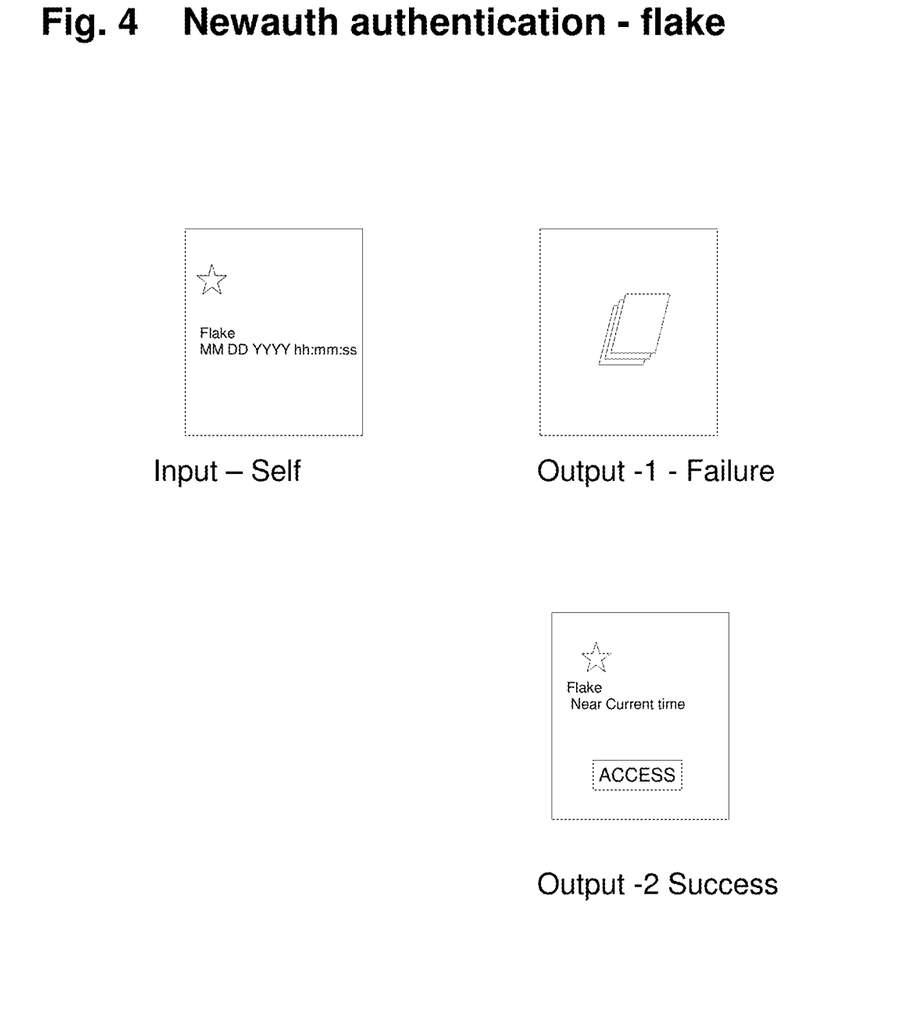
FIG. 4 This figure displays the flow when the user provides her own flake to the system. The system checks the flake's time stamp and if it is older than a predefined age, the user is presented with a set of images (output 1—failure) to authenticate against. When the user successfully authenticates, a new flake is issued to the user (output 2—success)

The preferred embodiment is the system as displayed in FIGS. 2-7
NewAuth
The system accepts two flavors of inputs.
  Secret Username (FIG. 2)
    This is typically the manner in which an owner of a Newauth account accesses the system for the first time from a device.
    After successful authentication, the system generates a flake and saves it on the device. All future interactions with the system occur through the latest flake on the device. The flake keeps changing after every authentication.
  Flake (FIG. 4)
  Flake is a more common input to the Newauth system. It is a user identifier and a proof of presence rolled into one. Flake is typically how client systems (Newauth client or non-newauth clients) interact with a Newauth system. Flake can be stored in computer memory and be made available to any system that wants to interact with a Newauth user. Sharing flake does not endanger the Newauth user's digital security. For the receiver, it works as a guarantee that the receiver is indeed interacting with a valid Newauth user. Every flake has the create time of the flake attached to it. This helps the receiver system to decide whether they want to allow the user to access their system or request a fresh flake. Each client system independently decides the age of oldest flake that the client system accepts. That age is dependent on the risk of the transaction that the client system conducts for the user. Some transactions have flake age restrictions imposed by
  Newauth. These age restrictions work by forcing the user to re-authenticate if they can not produce a flake which was generated within the age restriction.
  Visual representation of a flake
    FIG. 7 displays a visual representation of a flake.
    Flake is essentially a large number which is encoded as a hash. Hashing is done to ensure that the large number behind the flake is not revealed. The hashed text value can easily be exchanged between computer systems. However, there are scenarios where the flake may need to be scanned for usage. For that purpose, a different visual representation is chosen. The hash generated is graphed radially. This representation gives a flake resemblance to a snow flake. The graphical image can be scanned and converted back to the hash value and processed as a flake.
Some example usage scenarios
  Scenario 1—A user accesses Newauth through a flake (FIG. 4)
    1. System checks whether the flake was generated on the same device, whether the flake was generated within the time frame allowed by the Newauth system and whether there is an active session for this flake.
    2. If this criteria is met, user is granted access (FIG. 4 Output −2).
    3. If either the flake is too old or a session does not exist, the user is asked to re-authenticate and thereby generate a new flake (FIG. 4 Output −1).
  Scenario 2—A logged in user A queries a flake of another user B (FIGS. 5-3)
    1. System checks checks whether user A's session is active.
    2. If the session is active, it checks whether the flake for user B is valid, if the flake is valid, then it checks whether the flake for user B contained any information attached to it for user A. If user A specific information exists under the flake of user B, the system returns that information to user A.
    3. If there is no attached information for user A, it returns the information about user B depending upon user A's access level.
    4. Access level 1 gets B's alias name. Access level 2 gets B'a full name. Access level 3 gets B's full name, and the approximate location of the device which was used to generate the flake. And So on.
  Scenario 3—An external user queries a flake of a Newauth user (FIGS. 5-1)
    1. The system can be queried for any flake and if the querying user is not logged into the system, the system returns basic information about the flake (not the information of the 'user' who generated it).
    2. The system confirms whether the flake is genuine or not and the time it was generated.
  Scenario 4—A logged in user posts a transaction to own flake
    1. Every action in Newauth network is a transaction. Every message, content post, comment, like, dislike, payment, rejection of payment, purchase, return is a transaction. This scenario represents the case where a user initiates a transaction for their own flake. These are transactions which can be completed with only the initiator's account (e.g. posting a status update).
    2. Before posting the transaction to the account, the system checks whether user's session is active.
    3. System checks that the flake used to create the transaction is the same flake as in the session. It also checks whether the flake was generated within the age restriction allowed for that transaction.
  Scenario 5—A logged in user A posts a transaction to another logged in user B's flake
    1. System checks checks whether user A's session is active.

Figure 5:
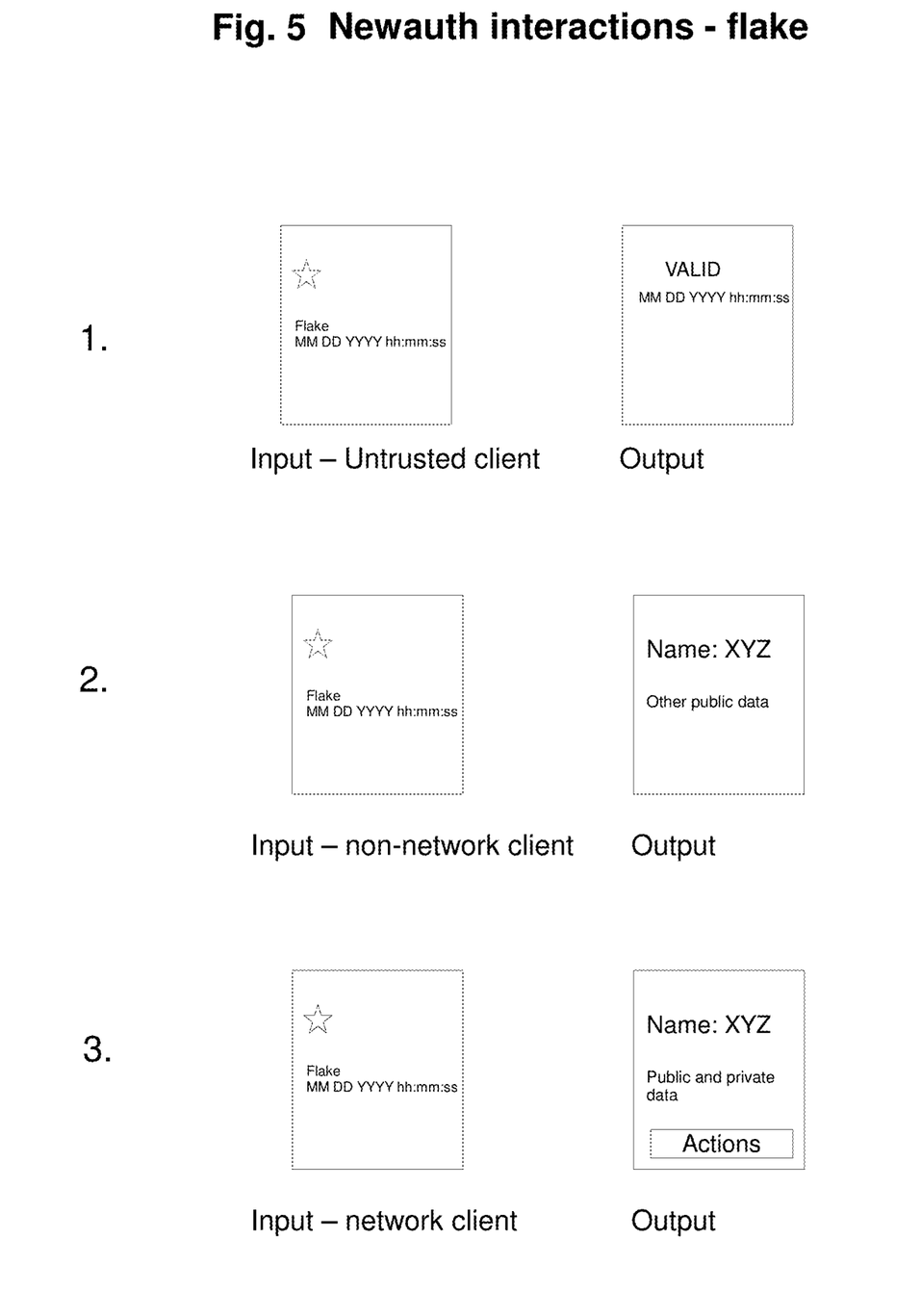
FIG. 5 This figure shows various interactions involving flakes. In general, these interactions involve two flakes as input. An originator flake and a target flake. The flakes shown in the figures represent target flakes. The interactions are originated by a user who does not own the target flake.

2. If the session is active, it checks whether the flake for user B is valid, if the flake is valid, then it checks whether the intended transaction requires B's approval.
3. If there is no approval required for the transaction, the system posts the transaction to user B.
4. If the intended transaction requires an approval from user B, the system posts a transaction alert to user B who is then supposed to approve the transaction by providing a flake generated within the time frame required by the transaction.
5. Once User B approves the transaction, the transaction is posted to user B.

Scenario 6—A logged in user posts a transaction to another remote user's flake
1. System checks checks whether user A's session is active.
2. If the session is active, it checks whether the flake for user B is valid, if the flake is valid, then it checks whether the intended transaction requires B's approval.
3. If there is no approval required for the transaction, the system posts the transaction to user B.
4. If the intended transaction requires an approval from user B, the system posts a transaction alert to user B who is then supposed to approve the transaction by providing a flake generated within the time frame required by the transaction. Once User B approves the transaction, the system posts an advice to user A.
5. Once user A accepts the advice, system posts the transaction to user B.

Scenario 7—A POS detects a user's personal device in range and the POS selects this user's flake for transaction
1. This scenario is similar to Scenario 5 with the only difference being that the user A in this scenario is the owner or operator of the POS.

DESCRIPTION OF FEW OTHER EMBODIMENT

Generating Flake from Non-Visual Input

In the description for the preferred embodiment we described a way to capture additional entropy during the authentication process and use that to create a unique ID (flake) which can be used as a user id and a password at the same time. In the preferred embodiment, this entropy is available in the form of co-ordinates of user's clicked locations and the time taken to perform those clicks.

The same concept could work with some other mechanisms of user authentication. The processes used during finger print scans and iris scans generate randomness which could serve this purpose. The information recorded during the scan process has enough randomness to provide input for flake generation. The information returned by scanning client is used to find out if a pre-determined number of features exist in the data. After this check, the remaining data is discarded. In order to generate a flake, the data need not be discarded. It can be hashed much like the data in the preferred embodiment and used as a flake.

It is also possible to employ this concept in traditional password based authentication. The client could capture the time used to enter the password and use that information to come up with a flake. The limitation of this would be with the amount of randomness generated. It can be argued that the time taken by a user to enter a password will not be random enough. So, there could be collisions (same flake generated during a different attempts). A way to skirt that issue would be to augment the entropy at server end. The server could generate a long random number and use that along with the time factor returned by client. The problem with that approach is that it dilutes the "proof of presence" afforded by this embodiment. Since the flake generated here is mainly using the server generated entropy and not client provided entropy, one would not rely on that flake as a proof of user presence.

BRIEF DESCRIPTION OF DRAWINGS

The user is expected to click on parts of image which the user has already registered with the system.

Output 1 results when the user does not click on the same image parts registered with the system. After the failure, the system displays a different set of images for user to click on.

Output 2 results when the user clicks on the image parts registered for each image. After successful authentication, a flake is generated and returned to the client.

In the panel 1, a user sends a flake of target user to Newauth. The transaction comes from an untrusted client, meaning that the device used for this transaction is not known to Newauth. In such an interaction, Newauth only confirms whether the target flake is valid or not along with returning the time when the flake was created.

In panel 2, the originator of the transaction is not logged into Newauth network, even though they are sending the target user's flake from a device known to Newauth. In this instance, Newauth returns the target flake owner's name and some other public data.

In panel 3, the originator of the transaction is logged into Newauth network and they send target user's flake to Newauth. In this instance, Newauth returns the name, public data and relevant private data to the originator. The private data includes allowed actions also.

FIG. 6 This figure describes the process of flake generation in Newauth. Flake is created by using information generated during authentication. Entropy is captured from client machine in the form of click co-ordinates and time taken to click on the image part. Co-ordinates are used in authenticating the user and after authenticating, their entropy is utilized to generate the flake. If the system finds the entropy from client side insufficient, it adds some additional entropy on server side. All this data is fed into a function which generates the flake.

FIG. 7 This figure displays the visual representation of a flake. In panel 1, various components of a flake are displayed, e.g. the hash value which is graphed radially to create the flake display and the create time when the flake was created.

In panel 2, the flake alone is displayed. This is the most common form to display a flake on a device. This flake identifies a user uniquely in the Newauth system. Once scanned, this can be converted into the hash value displayed in the panel 1 and transmitted as needed.

FIG. 8 This figure describes a generalized process of flake generation. Flake is created by using information generated during authentication. Entropy is captured from client machine. The client machine has a UI (user interface) which the user interacts with. User generated data is used in authenticating the user and after authenticating, the additional entropy is utilized to generate the flake. If the system finds the entropy from client side insufficient, it adds some additional entropy on server side. All this data is fed into a function which generates the flake.

What is claimed is:

1. A method to authorize a transaction for a user, where-in the transaction is processed by a device, the method comprising:

the device receiving a first flake for the user;

the device querying the first flake from a data-store and receiving a first user detail and a first specific time associated with the first flake from the data-store;

the device comparing the first specific time with a current stored time value, where-in the current stored time value is the current time at the location of the transaction;

when the first specific time is before the current stored time value, the device requesting another flake associated with the user and a second time, where-in the second time is any time after the current stored time value;

the user generating a second flake, where-in generating a flake comprises;

a. displaying, by a second device, a current image that represents an image, of a multitudes of images associated with said user, wherein the multitudes of images are stored in a user account stored in the datastore and each image of the multitudes of images is associated with a unique value;

b. dividing said current image into a grid layout, wherein dividing into a grid layout said current image comprises dividing said current image into a set of grid cells that comprises a plurality of grid cells representing said current image and each grid cell from said set of grid cells being associated with a unique value of a set of unique values of a plurality of values;

c. selecting, by the user, a grid cell from the set of grid cells, where-in selecting comprises clicking on a point location within the said grid-cell;

d. generating a set of ordered unique values comprising a unique value associated with said selected grid cell;

e. generating a set of entropy values comprising co-ordinates of the said point location and the time taken by the user to perform said click;

f. storing said sets of ordered unique values and entropy values in memory;

g. updating the display by setting said current image to a new image, of the multitudes of images associated with said user, received by the second device from the datastore h. repeating step b to obtain a set of grid cells associated with said new image;

i. selecting, by the user, a grid cell from the set of grid cells associated with said new image, where-in selecting comprises clicking on a point location within the said grid-cell;

j. concatenating a unique value associated with said selected grid cell from the set of grid cells associated with said new image to said set of ordered unique values previously stored in memory;

k. concatenating to the set of entropy values a co-ordinates of the said point location and a time taken by the user to perform said click;

l. repeating steps g through k until said stored sets of ordered unique values and entropy values have a predetermined number of unique values;

m. authenticating said user by matching said stored set of ordered unique values to a set of generated ordered unique values, wherein the set of generated ordered unique values is generated by concatenating unique values associated with the images displayed in steps a and the multitudes of steps g, wherein the images displayed in steps a and the multitudes of steps g are stored in the user account, and the predetermined number during authentication is based on a risk rating of a client that is performing the authentication and may be less than the number of the multitudes of images stored in the user account stored in the datastore;

n. when successfully authenticated, generating the second flake for the user, where-in generating the second flake comprises, creating a hashed value from the said set of stored entropy values and storing the hashed value along with a current time stamp, where-in the hashed value and the current time stamp is stored in the user account in the datastore;

the datastore sending the second flake to the second device;

the second device sending the second flake to the device;

the device querying the second flake from the data-store and receiving a second user detail and a second specific time associated with the second flake from the data-store;

the device validating that the second user detail matches the first user detail and comparing the second specific time with the current stored time value; and the device authorizing the transaction when the second specific time is any time after the current stored time value.

* * * * *